(12) United States Patent
Wu et al.

(10) Patent No.: US 11,795,021 B2
(45) Date of Patent: Oct. 24, 2023

(54) INFORMATION HANDLING SYSTEM DISPLAY ASSEMBLY

(71) Applicant: Dell Products L.P., Round Rock, TX (US)

(72) Inventors: Chin-Chung Wu, New Taipei (TW); Tsai Chien Lin, Taoyuan (TW); James Gossett, Tow, TX (US); Wan Li Chen, New Taipei (TW); Jing-Tang Wu, Yunlin County (TW); Hung-Chun Huang, Taoyuan (TW)

(73) Assignee: Dell Products L.P., Round Rock, TX (US)

( * ) Notice: Subject to any disclaimer, the term of this patent is extended or adjusted under 35 U.S.C. 154(b) by 340 days.

(21) Appl. No.: 17/023,799

(22) Filed: Sep. 17, 2020

(65) Prior Publication Data
US 2022/0081244 A1 Mar. 17, 2022

(51) Int. Cl.
*B65H 19/10* (2006.01)
*B65H 35/00* (2006.01)

(52) U.S. Cl.
CPC ....... *B65H 19/102* (2013.01); *B65H 35/0033* (2013.01); *B65H 2301/4607* (2013.01)

(58) Field of Classification Search
CPC ........ B65H 2301/4607; B65H 35/0033; B65H 19/102; G02F 2202/28; G02F 1/1333; G02F 1/133331; B29C 63/0004; B29C 63/0047; B62C 63/0095; B62C 63/102; B62C 63/024; Y10T 156/1195; Y10T 156/17; Y10T 156/1978; Y10T 159/1994
See application file for complete search history.

(56) References Cited

U.S. PATENT DOCUMENTS

| 7,097,903 B2 * | 8/2006 | Kishioka | C09J 7/385 |
| | | | 428/40.1 |
| 10,100,228 B2 * | 10/2018 | Vemulapati | C09J 5/00 |
| 2014/0138011 A1 * | 5/2014 | McClure | C09J 7/38 |
| | | | 156/367 |

OTHER PUBLICATIONS

Fujifilm Prescale Pressure Measurement Film Products Guide, Fujifilm, Printed 2009, month of publication unknown https://www.calpower.it/gallery/prescale_cp.pdf (Year: 2009).*

* cited by examiner

*Primary Examiner* — Philip C Tucker
*Assistant Examiner* — Alexander S Wright
(74) *Attorney, Agent, or Firm* — Norton Rose Fulbright US LLP

(57) ABSTRACT

A method for assembling an information handling system display may include attaching a first side of a strip of double-sided tape to a display panel cover. A display panel may then be aligned with the display panel cover, and, when aligned, the display panel may be in contact with a release paper attached to a second side of the double-sided tape. The release paper may then be removed from the double-sided tape while the display panel is in contact with the release paper. A first surface of the display panel may be attached to the second side of the double-sided tape as the release paper is removed.

15 Claims, 11 Drawing Sheets

INFORMATION HANDLING SYSTEM DISPLAY ASSEMBLY

FIELD OF THE DISCLOSURE

The present disclosure generally relates to information handling systems, and more particularly relates to assembly of information handling system displays.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Many information handling systems include displays. Information handling system displays can allow users to view and manipulate information. For example, desktop computers may be connected to one or more external displays. Tablets and smart phones may include integrated displays. Notebook computers may also include displays integrated into the notebook, such as hinge-up displays housed in an upper shell of the notebook. Information handling system displays may include liquid crystal displays (LCDs), light emitting diode displays (LED displays) organic LED displays (OLED displays), or other types of displays. For example, greater than 90% of consumer notebook computers may include LCD hinge-up displays.

Displays of information handling systems may fail, requiring service or replacement. Service technicians may disassemble information handling system displays to repair and/or replace one or more display components. The cost of servicing information handling system displays, such as notebook computer displays, may be substantial. For some devices, such as notebook computers, a cost of servicing and/or repairing displays may be in excess of two dollars per unit shipped.

When assembling or reassembling an information handling system display proper alignment between components, such as display panels and display panel covers, may be important. Misaligned components, such as misaligned display covers and display panels may negatively impact a user experience. For example, misalignment between a display panel and a display cover can allow particles such as food, dust, and other detritus to enter the display housing. Such particles can cause damage to internal display components. Furthermore, misalignment between a display panel and a display cover can negatively impact the aesthetic appeal of the display. Misalignment can cause the display to contact components that it should not contact, such as when closing a notebook, and such contact can cause damage to the display. If a repair technician is aware of the misalignment, the repair technician may adjust the alignment to properly align the display panel and the display panel cover. However, such correction may require additional repair materials, further increasing repair costs.

Furthermore, it is important to securely assemble information handling system display components together so that the information handling system remains securely assembled. For example, if a display cover and display panel are not securely attached, the information handling system components may become detached from each other, potentially rendering the information handling system inoperable, damaging the components, and/or harming a user.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system display assembly may be improved through the use of a process to improve alignment between a display panel, such as an LCD display panel, and a display cover, such as an LCD display cover prior to attachment of the display panel to the display panel cover. For example, a strip of double-sided tape may be used to attach a display panel to a display panel cover. The double-sided tape may include release paper on at least one side of the double-sided tape that can be removed from the tape while the tape is pressed between the display panel cover and the display panel. Removal of the release paper from the tape while the tape is between the display panel and the display panel cover can allow the display panel to be properly aligned against the display panel cover before the display panel is attached to the display panel cover via the double-sided tape. For example, the release paper on a side of the double-sided tape adjacent the display panel may be reverse folded, such that the release paper may be removed from the tape easily when pulled out from between the display panel and the display panel cover by a technician. Furthermore, a pressure gauge strip may be positioned on the display panel after the release paper is removed from the double sided tape to allow a technician to verify that sufficient pressure has been applied to the portion of the display panel attached by the double-sided tape to the display panel cover to attach the display panel to the display panel cover. The pressure gauge strip may assist technicians with verification that displays have been properly assembled. Thus, the double-sided tape and pressure gauge strip disclosed herein may improve information handling display assembly by allowing for more accurate and consistent assembly.

A method for information handling system display assembly may begin with attaching a first side of a strip of double-sided tape to a display panel cover. For example, a release paper may be removed from a bottom surface of the piece of double-sided tape to expose an adhesive on the tape. The tape may be aligned with an appropriate position on the display panel cover, and the first side of the strip of double-sided tape may be pressed against the display cover, attaching the tape to the display cover. In some embodiments, a piece of double-sided tape may be attached to each of two locations on the display cover. The double-sided tape may be [s]Safe-[r]Release™ tape (i.e., releasable tape).

After the tape is attached to the display panel cover, a display panel may be aligned with the display panel cover. For example, a display panel may be placed on the display panel cover and centered on the display panel cover at a predetermined location. The display panel may be in contact with a release paper on a second, top, side of the strip of double-sided tape. The release paper on the second side of the strip of double-sided tape may be reverse folded release paper. For example, a first portion of the release paper may be attached to a second side of the double-sided tape. At one end of the release paper, the release paper may fold back on itself, and a second portion of the release paper may extend along the length of the first portion of the release paper. In some embodiments, the second portion of the release paper may extend beyond an end of the first portion of the release paper and beyond an end of the double-sided tape. For example, the second portion of the release paper may include a tab that extends beyond an end of the double-sided tape for grasping and removal of the release paper when the release paper and double-sided tape are pressed between a display panel and a display panel cover.

When the display panel is aligned with the display panel cover, the release paper may be removed from the second side of the double-sided tape. For example, the release paper may be pulled out from between the display panel and the double-sided tape. As the release paper is pulled out, a first surface of the display panel may attach to the second side of the double-sided tape. For example, a tab of a reverse-folded release paper extending beyond the display panel, the display panel cover, and the double-sided tape, may be used to pull the release paper out from between the display panel and the double-sided tape. Thus, alignment may be established between the display panel and the display panel cover before attaching the display panel to the display panel cover via the double-sided tape. The alignment may be maintained while removing the release paper from between the display panel and the double-sided tape attached to the display panel cover.

A pressure gauge strip may be used to verify that a predetermined pressure has been applied to a display panel cover, double-sided tape, and a display panel to couple the display panel to the display panel cover via the double-sided tape. For example, a pressure gauge strip may be aligned with a first portion of a second surface of the display panel opposite a first portion of the first surface of the display panel that is attached to the second side of the double-sided tape. In some embodiments, when two pieces of double-sided tape are used to attach two different portions of the display panel to two different portions of the display cover, a pressure gauge strip may be used for each piece of double-sided tape, such as for double-sided tape attached to a right hand side and a left hand side of the display panel.

A predetermined pressure may be applied to the pressure gauge strip, causing a pressure application indicator to appear. After the pressure application indicator has appeared, the pressure gauge strip may be removed from the information handling system display panel.

When a pressure equal to or greater than the predetermined pressure is applied to the pressure gauge strip, a pressure application indicator may appear on the strip. The pressure gauge strip may, for example, include pressure sensitive tape or film that changes color when a pressure equal to or greater than the predetermined pressure is applied. The pressure application indicator, may, for example, include a color change. In some embodiments, the pressure gauge strip may include a Mylar® (i.e., biaxially oriented polyethylene terephthalate (PET)) strip, and a sponge attached to a surface of the Mylar® (PET) strip. The Mylar® (PET) strip may include a tailor line. When a pressure equal to or greater than the predetermined pressure is applied to the Mylar® (PET) strip, such as to a portion of the Mylar® (PET) strip inside the tailor line, the sponge may compress and the Mylar® (PET) strip may break along the tailor line. Thus, the pressure application indicator may be a breaking of the Mylar® (PET) strip along the tailor line. For example, the Mylar® (PET) strip and attached sponge may be placed on a portion of a display panel that is attached to the display panel cover by double-sided tape, with the sponge located between the information handling system display panel and the Mylar® (PET) strip. A pressure may be applied to a portion of the Mylar® (PET) strip inside the tailor line to apply pressure to a portion of the display panel that is attached to the display panel cover by the double-sided tape to strengthen the coupling between the display panel and the display panel cover. When a predetermined pressure is applied, the Mylar® (PET) strip may break along the tailor line. In some embodiments, the area inside the tailor line may be less than an area of the double-sided tape. In other embodiments, the area inside the tailor line may be greater than the area of the double-sided tape In some embodiments, the Mylar® (PET) may make a snapping sound when it is broken along the tailor line, indicating that the predetermined pressure has been applied. In some embodiments, the Mylar® (PET) strip may also be attached to pressure sensitive tape, such that breaking of the Mylar® (PET) strip along the tailor line and a change in color of the pressure sensitive tape are both exhibited when the predetermined pressure is applied. In some embodiments, the Mylar® (PET) strip may be included in a sheet of Mylar® (PET). For example, a sheet of Mylar® (PET) may include and may be shaped to position two Mylar® (PET) strips at predetermined areas on right hand and left hand sides of the display panel. Thus, the Mylar® (PET) sheet may include two tailor lines and two sponges, one for a left hand side of a display panel and one for a right hand side of the display panel. Pressure may be applied to each of the two strips of Mylar® (PET) breaking each of the tailor lines. Thus, a predetermined pressure may be applied to two portions of a display panel to confirm that two pieces of double-sided tape have coupled the display panel to the display panel cover.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
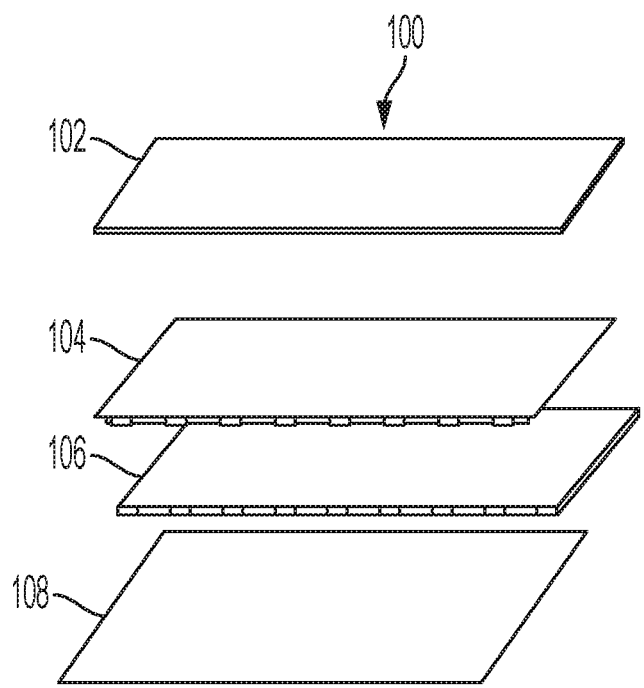
FIG. 1 is an illustration of a display panel cell, cover shield, backlight, and display panel cover according to some embodiments of the disclosure.

Information handling system displays may come in a variety of different shapes, sizes, and compositions. For example, information handling system displays may include LCDs, LED displays, OLED displays, and other kinds of displays. Some information handling systems, such as notebook computers, may include hinge-up displays that are connected to a base of the information handling system via a hinge. Information handling system displays, such as display 100 shown in FIG. 1, may include a variety of components. For example, an information handling system display may include a panel cover shield 102, a panel cell 104, a backlight 106, and a display panel cover 108. In some cases, the display panel cover shield 102, the display panel cell 104, and the display panel backlight 106 may be included in a single assembly referred to as the display panel. Display panels and other information handling system display components that experience malfunctions or damage may be replaced by trained technicians. When assembling a display, such as after disassembly for repair or replacement of defective parts, the display panel may be attached to a display panel cover 108 using double-sided tape.

Figure 2A:
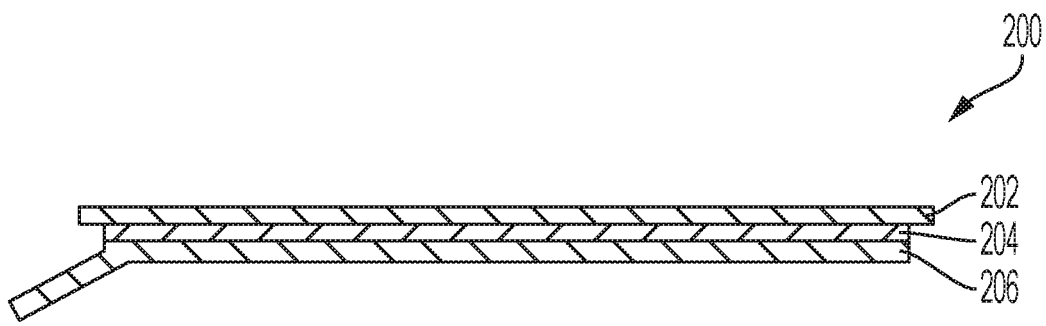
FIG. 2A is an illustration of double-sided tape without a reverse fold, according to some embodiments of this disclosure.

In assembling a display, alignment between the display panel and the display panel cover may be important to prevent particles from entering the display or a display from appearing lopsided or offset, damaging the display and/or detrimentally impacting the aesthetic appeal of the display. Double-sided tape, such as [s]afe-release tape, may be used to attach a display panel to a display panel cover. An example strip 200 of double-sided tape is shown in FIG. 2A. The strip 200 may include a first release paper 202, double-sided tape 204, and a second release paper 206. The release papers 202, 206 may prevent objects from adhering to the double-sided tape 204 and/or prevent the adhesive of the double-sided tape 204 from becoming ineffective before the double-sided tape is in position to be attached to one or more objects. For example, each surface of the double-sided tape 204 may be coated in an adhesive, and the release papers 202, 206 may prevent the adhesive from becoming degraded before the strip 200 is ready for use.

Figure 2B:
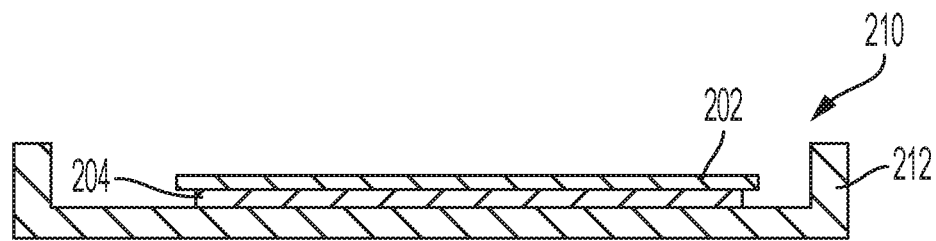
FIG. 2B is an illustration of a first stage of attaching a display panel to a display panel cover according to some embodiments of the disclosure.
Figure 2C:
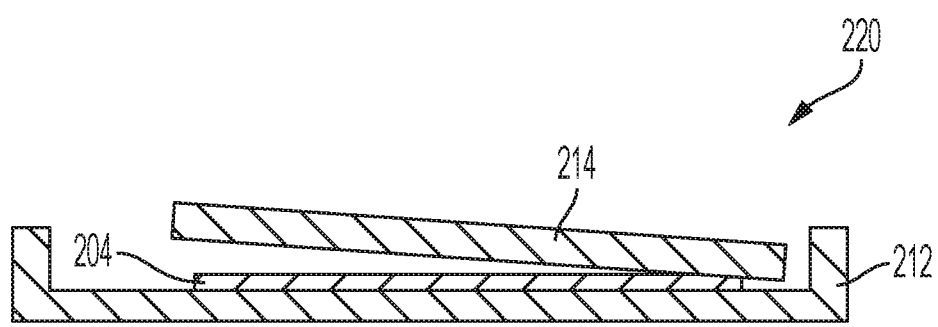
FIG. 2C is an illustration of a second stage of attaching a display panel to a display panel cover according to some embodiments of the disclosure.

When a technician is ready to attach a display panel to a display panel shield, the technician may remove the release paper 206, from a first surface of the double-sided tape 204 and may attach the first surface of the double-sided tape 204 to a display panel cover 212, as shown in step 210 of FIG. 2B. The technician may then remove the second release paper 202 from a second surface of the double-sided tape 204 and may adhere the display panel 214 to the display panel cover 212 via the double-sided tape 204, as shown in step 220 of FIG. 2C. If the technician aligns the display panel 214 with the display panel cover 212 before removing the second release paper 202, there may be insufficient space to remove the release paper from the double-sided tape. For example, the shear force between the release paper 202, the adhesive-coated double-sided tape 204, and the display panel 214 may prevent or impede removal of the second release paper from between the display panel 214 and the double-sided tape 204. Thus, the second release paper 202 may be removed prior to alignment of the display panel 214 with the display panel cover 212.

Figure 2D:
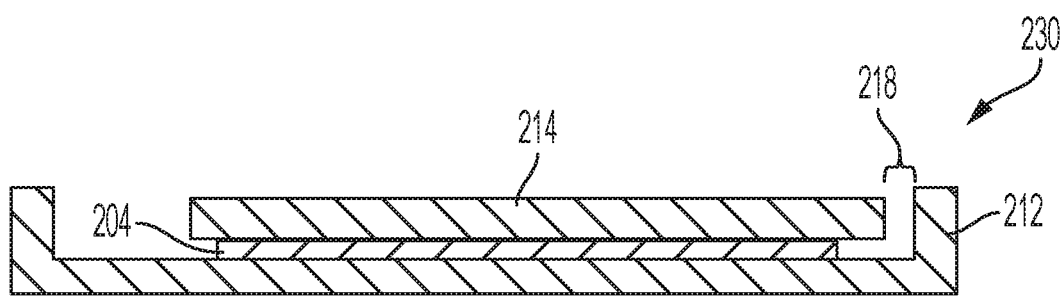
FIG. 2D is an illustration of a third stage of attaching a display panel to a display panel cover according to some embodiments of the disclosure

However, removal of the second release paper 202 before aligning the display panel 214 with the display panel cover 212 may allow for misalignment of the display panel 214 and the display panel cover 212. For example, if the second release paper 202 must be removed before aligning the display panel 214 with the display panel cover 212, a technician may have only a single opportunity to align the display panel 214 and the display panel cover 212 correctly. If the technician makes an error in the alignment, the display panel 214 has already been adhered to the display panel cover 212 via the double-sided tape 204. For example, as shown in step 230 of FIG. 2D, there may be a substantial gap 218 between the display panel 214 and an edge of the display panel cover 212. Such a gap may indicate misalignment between the display panel cover 212 and the display panel 214. A misalignment between the display panel cover 212 and the display panel 214 may allow particles to enter the display, potentially damaging the display. If the technician is aware of the misalignment, the technician may remove the display panel 214 from the display panel cover 212 and the double-sided tape 204. Doing so, however, may require replacement of the double-sided tape 204, increasing a cost of the repair.

Figure 3A:
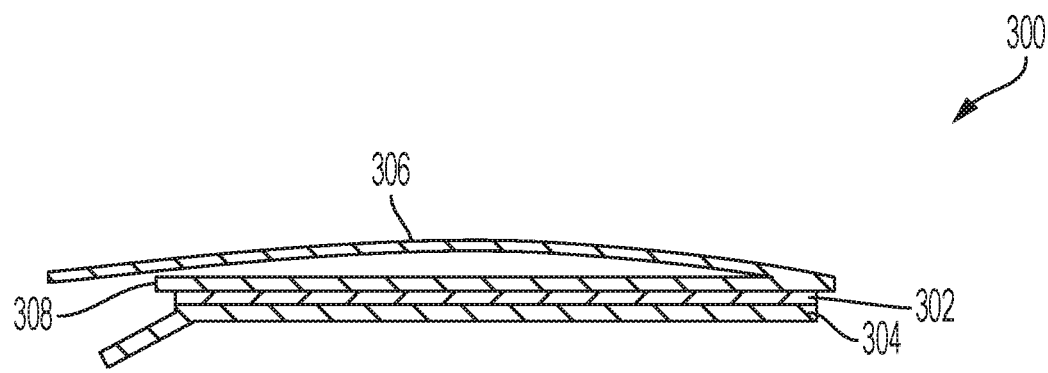
FIG. 3A is an illustration of double-sided tape having a release paper with a reverse fold according to some embodiments of the disclosure.

Waiting until after the display panel cover and the display panel are aligned to remove a release paper from a second surface of the display panel tape may allow an alignment of the display panel cover and the display panel to be adjusted prior to attaching the display panel to the display panel cover. For example, a reverse fold in a release paper of a piece of double-sided tape may allow a release paper to be removed while pressed between a display panel cover and a display panel, allowing an alignment to be maintained while also attaching the display panel to the display panel cover using double-sided tape. An example strip 300 of double-sided tape with a release paper 306 having a reverse fold is shown in FIG. 3A. As shown in FIG. 3A a first release paper 304 may be attached to a first surface of a double-sided tape 302. A first portion 308 of a second release paper may be attached to a second surface of the double-sided tape 302. A second portion 306 of the second release paper, may be reverse folded over the first portion 308 of the second release paper and may extend beyond the first portion 308 of the second release paper and the double-sided tape 302.

Figure 3B:
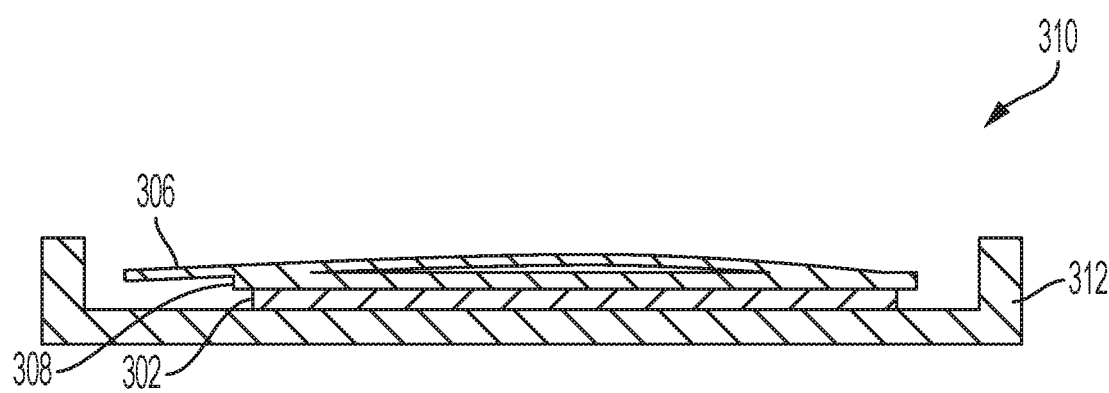
FIG. 3B is an illustration of a first stage of attaching a display panel to a display panel cover using double-sided tape having a release paper with a reverse fold according to some embodiments of the disclosure.

When a technician is ready to attach the display panel to the display panel cover, the technician may remove the first release paper 304 from the first surface of the double-sided tape 302, may align the double-sided tape with the display panel cover, and may attach the first surface of the double-sided tape to the display panel cover. For example, as shown in FIG. 3B, at a first step 310 the first surface of the double-sided tape 302 may be aligned an attached to a display panel cover 312. The first and second portions 308, 306 of the second release paper may remain in position, with the first portion 308 of the second release paper attached to a second surface of the double-sided tape 302.

Figure 3C:
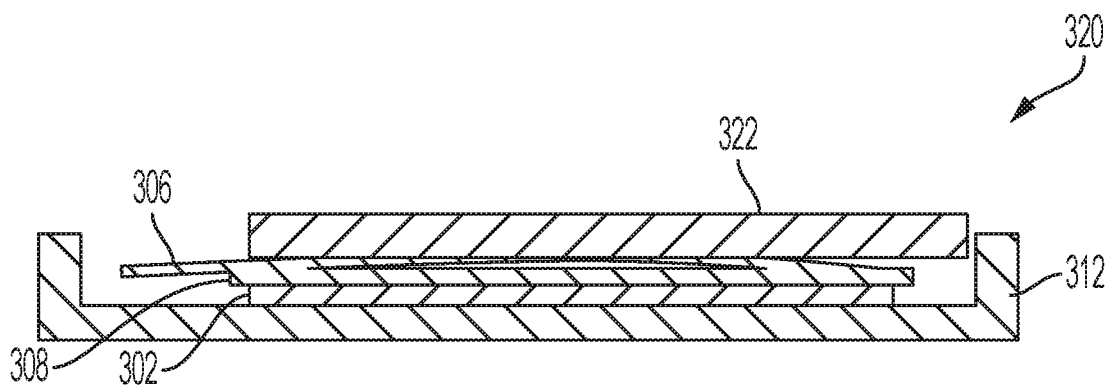
FIG. 3C is an illustration of a second stage of attaching a display panel to a display panel cover using double-sided tape having a release paper with a reverse fold according to some embodiments of the disclosure.

As shown in FIG. 3C, at a second step 320 a display panel 322 may be aligned with the display panel cover 312, resting on top of the second release paper 306, 308 and the display panel cover 312. The second portion 306 of the second release paper, may extend out from underneath the display panel 322. Because the second release paper 306, 308 is positioned between the display panel 322 and the display panel cover 312, an alignment of the display panel 322 and the display panel cover 312 may be adjusted as the display panel 322 is not yet attached to the double-sided tape 302.

Allowance for such adjustment may reduce the occurrence of detrimental gaps between the display panel 322 and the display panel cover 312.

Figure 3D:
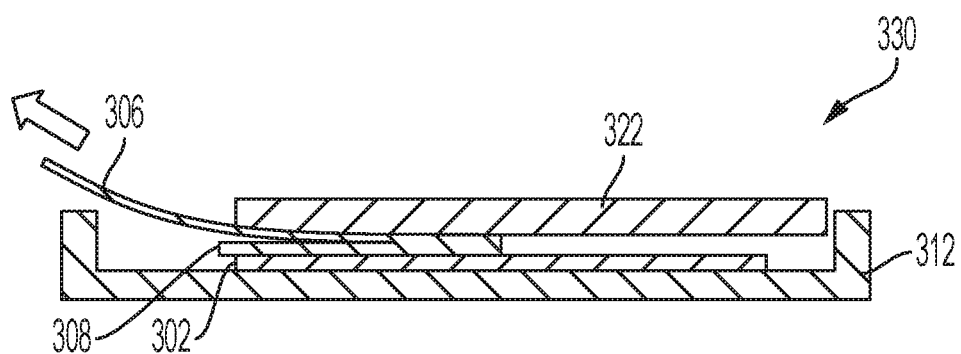
FIG. 3D is an illustration of a third stage of attaching a display panel to a display panel cover using double-sided tape having a release paper with a reverse fold according to some embodiments of the disclosure.
Figure 3E:
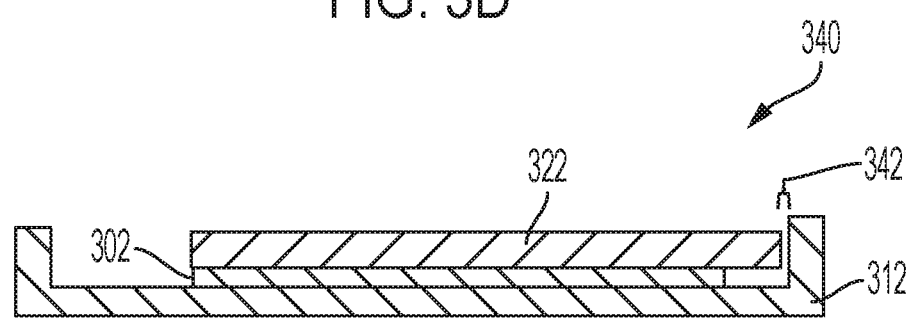
FIG. 3E is an illustration of a fourth stage of attaching a display panel to a display panel cover using double-sided tape having a release paper with a reverse fold according to some embodiments of the disclosure.

As shown in FIG. 3D, at a third step 330, the second release paper 306, 308 may be removed from between the display panel 322 and the display panel cover 312. For example, the second release paper 306, 308 may be pulled out from between the display panel 322 and the double-sided tape 302 by a portion of the second portion 306 of the second release paper that extends beyond the display panel 322 and the display panel cover 312. While the second release paper 306, 308 is removed, an alignment between the display panel 322 and the display panel cover 312 may be maintained. For example, the reverse fold of the second release paper 306, 308, may allow the release paper to be smoothly removed from between the display panel 322 and the display panel cover 312, allowing an alignment of the display panel 322 and the display panel cover 312 to be maintained while the display panel 322 is attached to the display panel cover 312 via the double-sided tape 302. For example, the reverse fold of the second release paper 306, 308 may allow pulling of the second portion 308 of the second release paper to generate a substantial separation force between the double-sided tape 302 and the second release paper 306, 308, overcoming a shear force between the second release paper 306, 308, the double-sided tape 302, and the display panel 322 and allowing for removal of the second release paper 306, 308 with ease. As shown in FIG. 3E, at a fourth step 340 the display panel 322 may be attached to the display panel cover 312 via the double-sided tape 302, with a correct alignment and little gap 342 between the display panel 322 and the display panel cover 312.

FIGS. 4A-D show a perspective view of steps of a process for assembling an information handling system display. At step 400 of FIG. 4A a first surface of a first piece of double-sided tape 404 is attached to right hand side of a display panel cover 402. A first surface of a second piece of double-sided tape 406 is attached to a left hand side of a display panel cover 402. The first and second pieces of double-sided tape may each have reverse-folded release papers attached to upper surfaces of the pieces of double-sided tape with tabs of the reverse-folded release paper extending beyond the edge of the display cover.

Figure 4A:
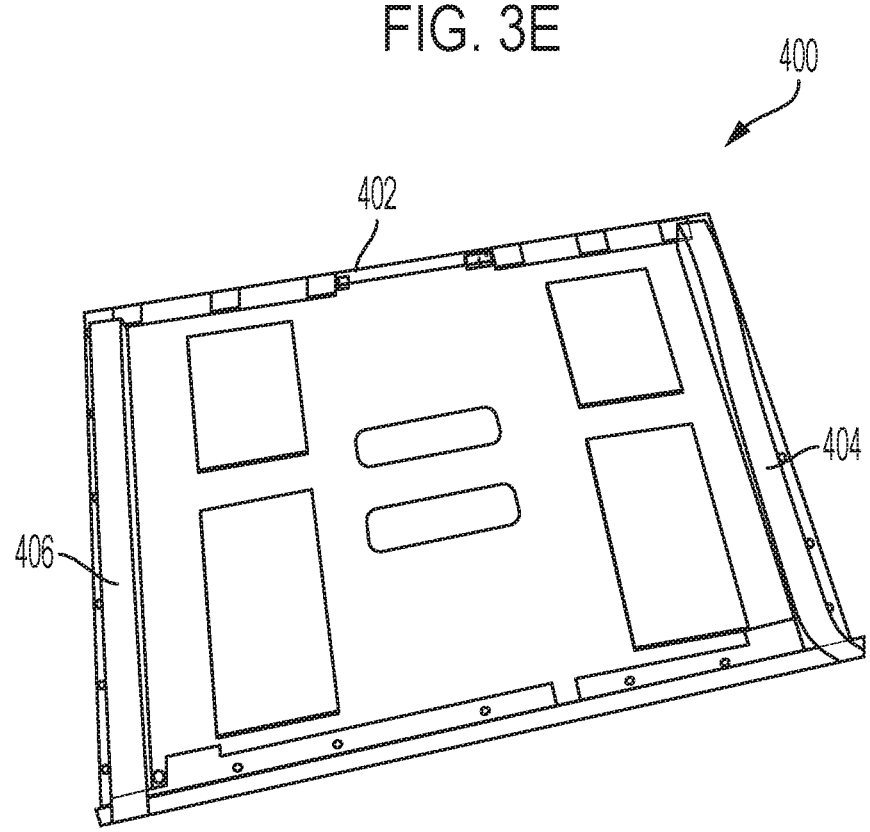
FIG. 4A is a perspective view of a first stage of attaching a display panel to a display panel cover using double-sided tape having a release paper with a reverse fold according to some embodiments of the disclosure.
Figure 4B:
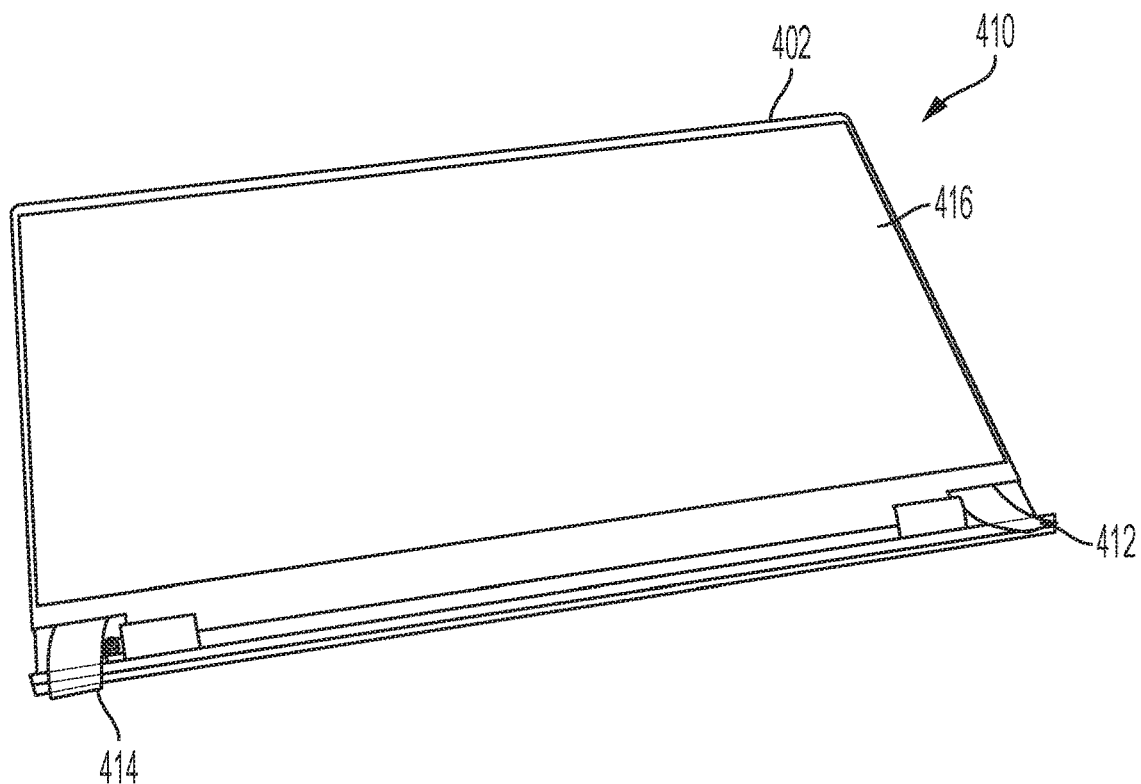
FIG. 4B is a perspective view of a second stage of attaching a display panel to a display panel cover using double-sided tape having a release paper with a reverse fold according to some embodiments of the disclosure.

At step 410 of FIG. 4B, a display panel 416 may be aligned with the display panel cover 402. For example, the display panel 416 may be aligned with and may rest on top of the display panel cover 402 and the first and second pieces of double-sided tape 404, 406. A first tab 412 of the first reverse-folded release paper attached to the first piece of double-sided tape 404 may extend out from between the display panel 416 and the display panel cover 402. A second tab 414 of the second reverse-folded release paper attached to the second piece of double-sided tape 406 may also extend out from between the display panel 416 and the display panel cover 402.

Figure 4C:
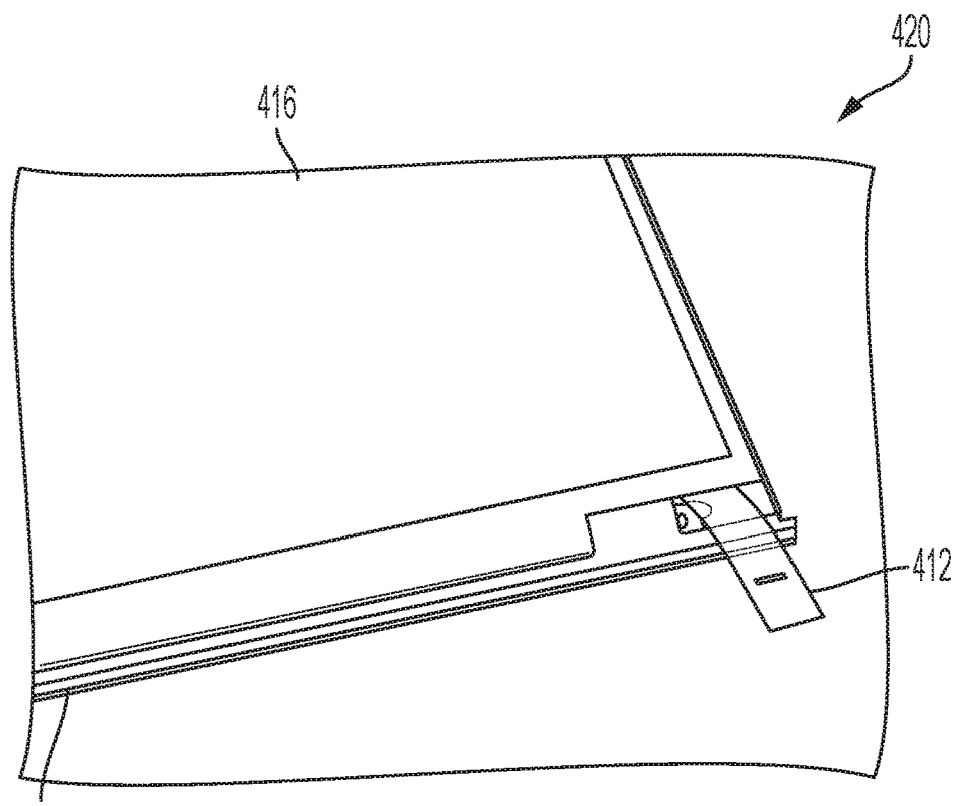
FIG. 4C is a perspective view of a third stage of attaching a display panel to a display panel cover using double-sided tape having a release paper with a reverse fold according to some embodiments of the disclosure.
Figure 4D:
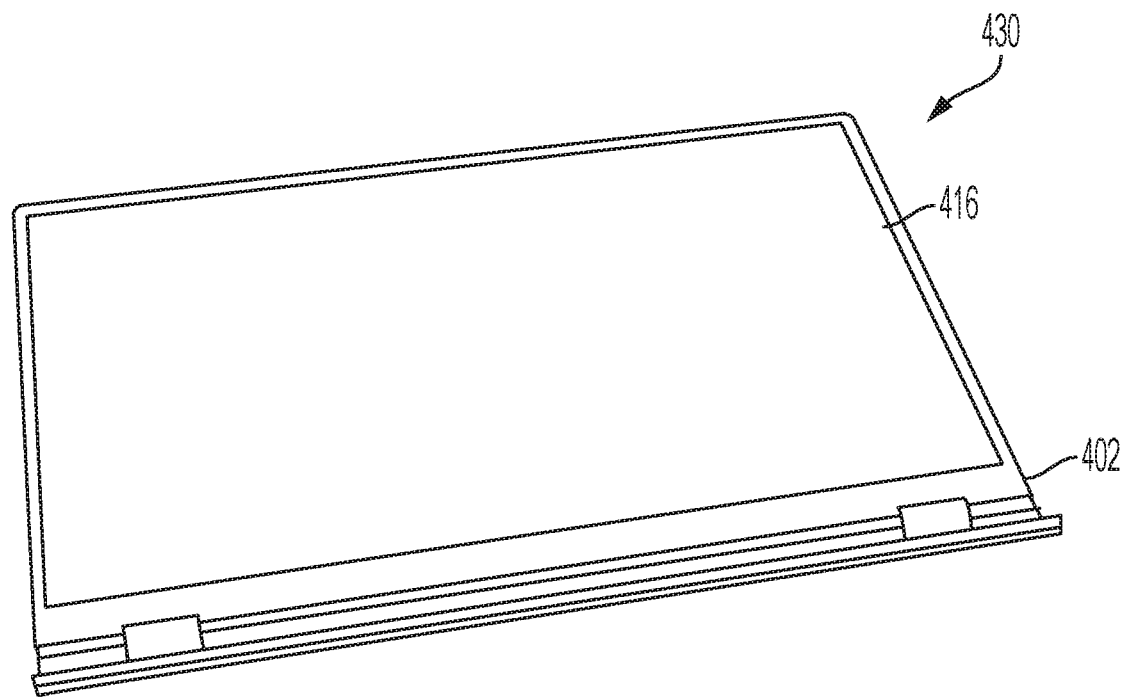
FIG. 4D is a perspective view of a fourth stage of attaching a display panel to a display panel cover using double-sided tape having a release paper with a reverse fold according to some embodiments of the disclosure.

At step 420 of FIG. 4C, the first reverse-folded release paper may be removed from between the display panel 416 and the display panel cover 402. For example, pressure may be applied to a display panel 416 to hold the display panel in alignment with the display panel cover 402, while the first reverse-folded release paper is removed from the first piece of double-sided tape using the tab 412. The second reverse-folded release paper may be removed from the second piece of double-sided tape 406 in a similar manner. At step 430 of FIG. 4D, the display panel 416 may be attached to the display panel cover 402 by the first and second pieces of double-sided tape 404, 406, with the first and second reverse-folded release papers having been removed from between the display panel 416 and the display panel cover 402. In some embodiments a bezel may be assembled around the display panel 416 once the display panel 416 is attached to the display panel cover 402.

Figure 5:
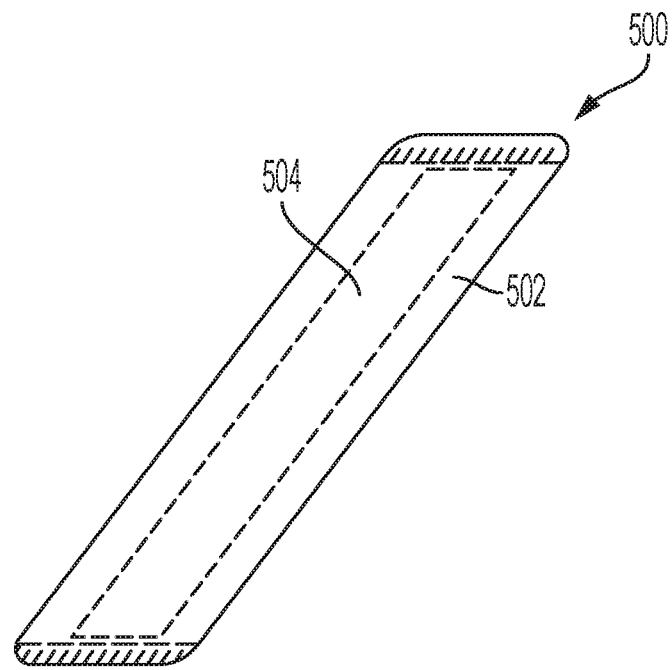
FIG. 5 is a perspective view of a pressure gauge strip, according to some embodiments of the disclosure.

After one or more release papers are removed from between the display panel and the display panel cover, pressure may be applied to the display panel, such as to a portion of the display panel adjacent to the double-sided tape to strengthen the connection between the display panel, the double-sided tape, and the display panel cover. For example, a predetermined pressure may be applied that is selected to verify that a strong connection has been established between the display panel, the display panel cover, and the double-sided tape. The predetermined pressure may, for example, be greater than or equal to two kilograms of force. In some embodiments, the double-sided tape may require less pressure than the predetermined pressure to securely attach the display panel to the display panel cover. For example, the double-sided tape may require at least one kilogram of force while pressure gauge strips, such as strips of tailored Mylar® (i.e., biaxially oriented polyethylene terephthalate (PET)) or strips of pressure-sensitive tape or film, may require application of at least two kilograms of force to cause a pressure application indicator to appear. As another example, the double-sided tape may require between two and six kilograms of force per square centimeter while the pressure gauge strip may also require between two and six kilograms of force per square centimeter to securely attach the display panel to the display panel cover using the double-sided tape. A pressure gauge strip may be used to verify that a predetermined pressure has been applied to the display panel at the appropriate locations. An example pressure gauge strip 500 is shown in FIG. 5. The strip 500 may, for example, formed from Mylar® (PET) or another flexible material. The strip may include a tailor line 502. The tailor line 502 may, for example, be a line of continuous perforations across a body of the strip 500. In some embodiments, the tailor line 502 may be a single straight line, or a line of another shape. In some embodiments, the tailor line 502 may encompass an area 400 of the strip 500, such as a square, rectangular, circular, or other area. When a predetermined pressure is applied to the area 504 of the strip 500 inside the tailor line 502, the strip 500 may break along the tailor line 502. In some embodiments, the breaking of the strip 500 along the tailor line 502 may make an audible sound, such as a snapping sound. The tailor line 502 may be designed to break when a predetermined pressure is applied to the double-sided tape. For example, an area 504 of the double-sided tape inside the tailor line 502 may be increased to require a greater application of force to break the strip 500 along the tailor line 502. Alternatively, a pattern of perforations or other weaknesses in the Mylar® (PET) strip 500 that form the tailor line 502 may be adjusted to adjust a pressure required to break the strip 500 along the tailor line 502

Figure 6A:
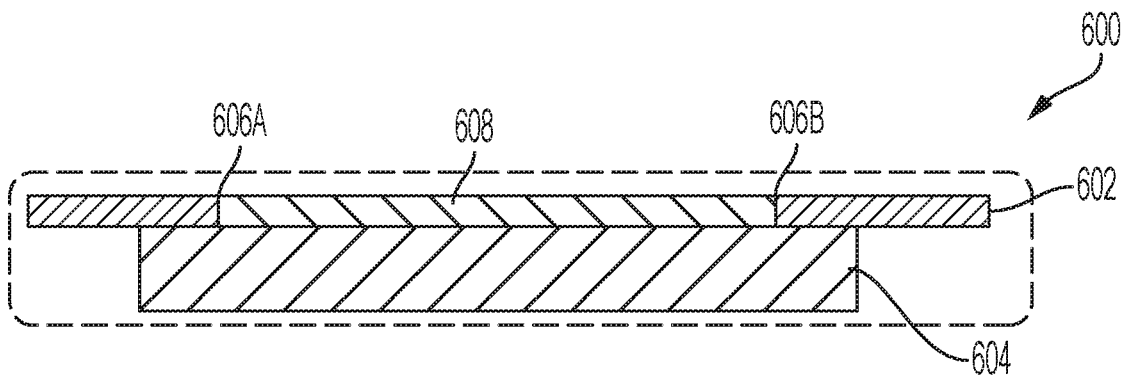
FIG. 6A is an illustration of a pressure gauge strip with an attached sponge, according to some embodiments of the disclosure.
Figure 6B:
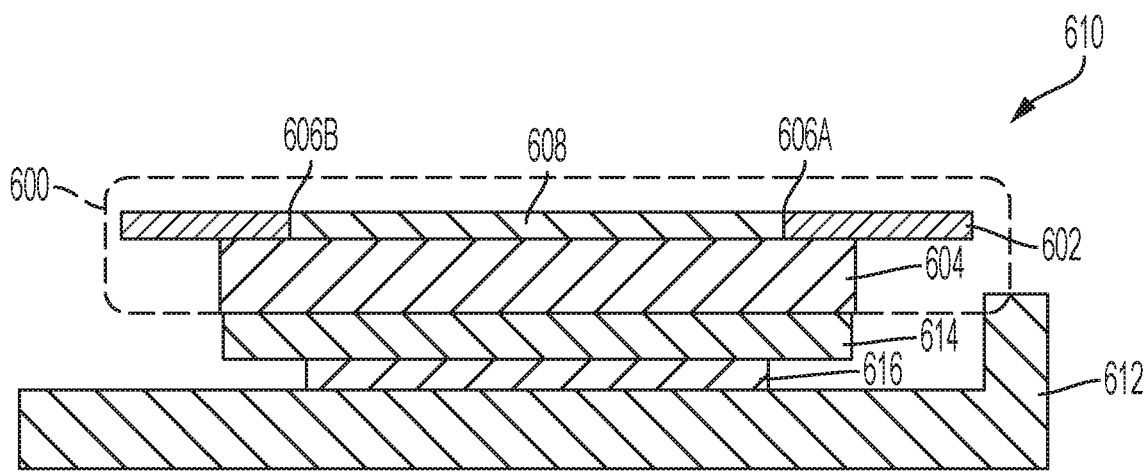
FIG. 6B is an illustration of a first stage of applying pressure to a display panel and display panel cover using a pressure gauge strip, according to some embodiments of the disclosure.
Figure 6C:
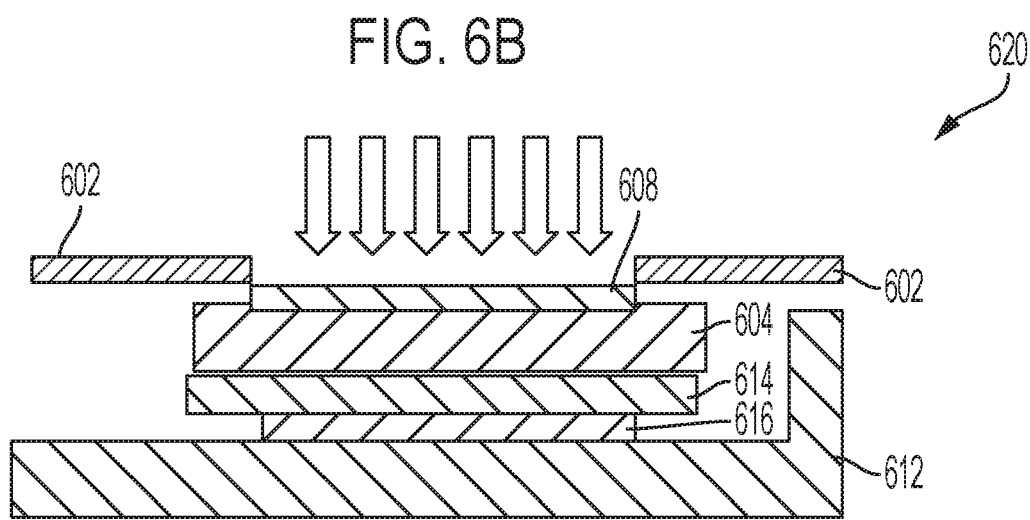
FIG. 6C is an illustration of a second stage of applying pressure to a display panel and display panel cover using a pressure gauge strip, according to some embodiments of the disclosure.

An example, pressure gauge strip 600 is shown in FIG. 6. The pressure gauge strip 600 may include a Mylar® (PET) strip 602 or a strip formed of another flexible material. The Mylar® (PET) strip 602 may include a first tailor line 606A and a second tailor line 606B. In some embodiments, the first and second tailor lines 606A-B may be comprised in a single continuous tailor line encompassing a first portion 608 of the Mylar® (PET) strip 602. The pressure gauge strip 600 may also include a sponge 604 attached to the Mylar® (PET) strip 602.

A pressure gauge strip 600 as shown in FIG. 6A may be placed on a portion of a display panel 614 that is coupled to a display panel cover 612 via double-sided tape 616, as shown in the diagram 610. For example, after a reverse folded release paper is removed from between the double-sided tape 616 and the display panel 614, a pressure gauge strip 600 may be aligned on the display panel 614 above the double-sided tape 616. The first and second tailor lines 606A-B may be cut such that when a predetermined pressure is applied to the portion 608 of the Mylar® (PET) strip 602 inside the tailor lines 606A-B the Mylar® (PET) strip 602 may break along the tailor lines 606A-B and the sponge 604 may be compressed. For example, as shown in diagram 620 of FIG. 6C, when a predetermined pressure is applied to the portion 608 of the Mylar® (PET) strip 602, the Mylar® (PET) strip may break along the tailor lines 606A-B. The predetermined pressure may, for example, be a pressure required to cause the display panel 614 to become fixed to the display panel cover 612 via the double-sided tape 616. The predetermined pressure may, for example, be an external downward force on the Mylar® (PET) sheet 602 or, more specifically, on portion 608 of the Mylar® (PET) sheet 602. The external downward force may produce a tension in the Mylar® (PET) sheet 602 that exceeds a tensile strength of the Mylar® (PET) sheet 602. The tensile strength of the Mylar® (PET) sheet 602 may be reduced by adjusting the form of the tailor line 606A-B, such as by weakening the Mylar® (PET) sheet 602 along the tailor line 606A-B more or less. For example, the tailor line 606A-B may include more dense or less dense punctures in the Mylar® (PET) sheet 602. The specific force required to break the Mylar® (PET) sheet 602 may also be directly related to a cross-sectional area of the Mylar® (PET) sheet 602 if a tensile strength of the Mylar® (PET) sheet 602 itself is fixed.

Figure 7A:
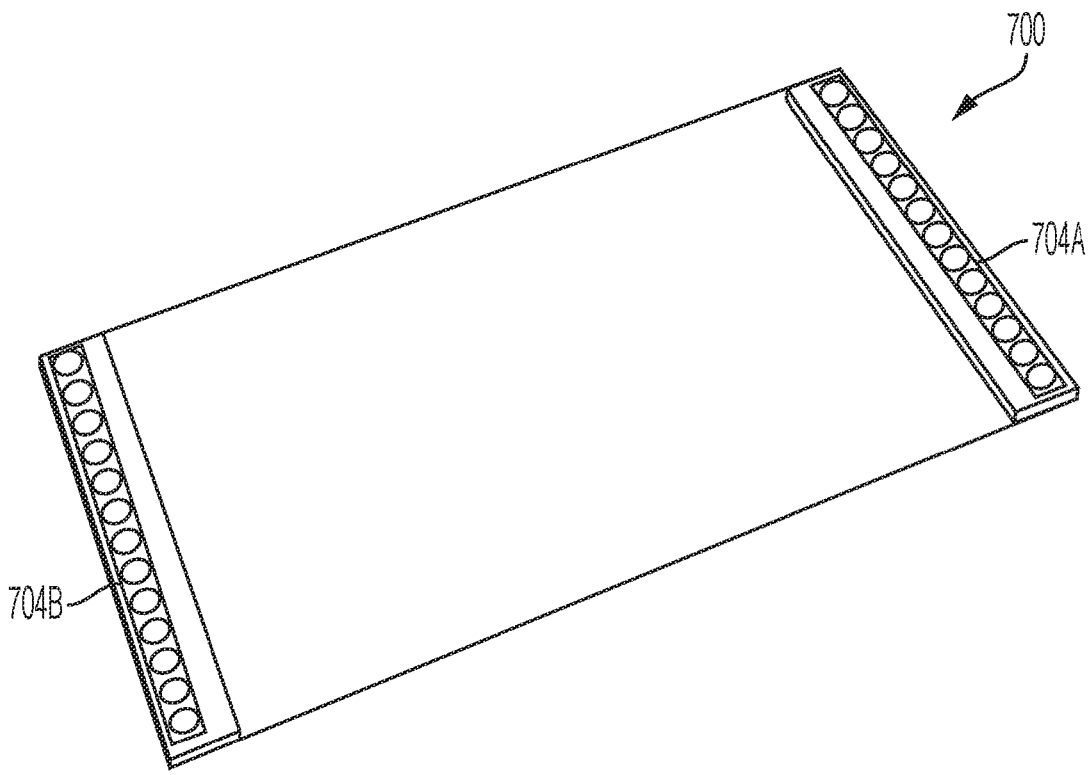
FIG. 7A is a perspective view of a Mylar® (i.e., biaxially oriented polyethylene terephthalate (PET)) sheet having two pressure gauge strips according to some embodiments of the disclosure.
Figure 7B:
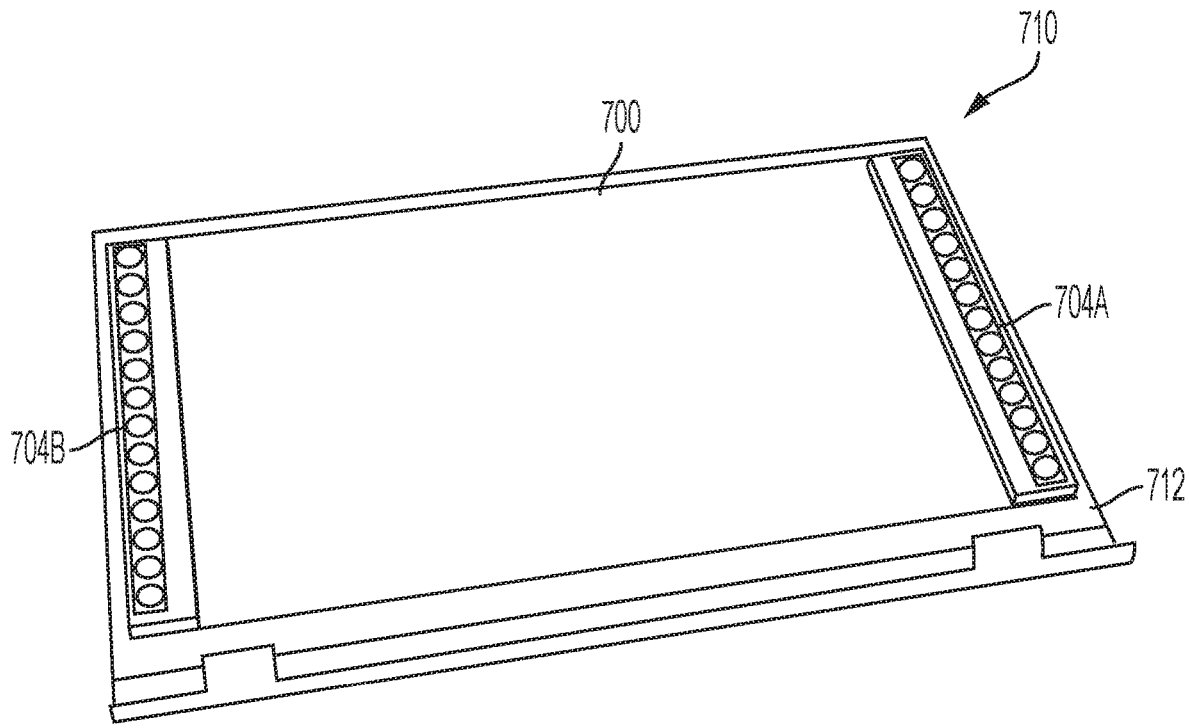
FIG. 7B is an illustration of a perspective view of a Mylar® (PET) sheet having two pressure gauge strips aligned with an information handling system display panel according to some embodiments of the disclosure.

As shown in FIG. 7A, multiple pressure gauge strips 704A-B, such as Mylar® (PET) strips having tailor lines and attached sponges, may be attached to a sheet 700 of protective Mylar® (PET). The sheet 700 may, for example, be shaped to assist a technician in aligning the pressure gauge strips 704A-B with a display panel. For example, the sheet 700 may include a first pressure gauge strip 704A on a right hand side and a second pressure gauge strip 704B on a left hand side. When the sheet 700 is aligned with a display panel of an information handling system display 710, as shown in FIG. 7B, the first and second pressure gauge strips may be aligned with double sided tape located between the display panel and the display panel cover 702. In some embodiments, the first and second pressure gauge strips 704A-B may have areas greater than an area of the double-sided tape The first and second pressure gauge strips 704A-B may each include pressure indicators, indicating where a technician is to apply pressure, such as to break a Mylar® (PET) strip along a tailor line to verify that sufficient pressure has been applied along the strips of double-sided tape. Once sufficient pressure has been applied, the sheet 700 of protective Mylar® (PET) may be removed from the display panel.

Figure 8:
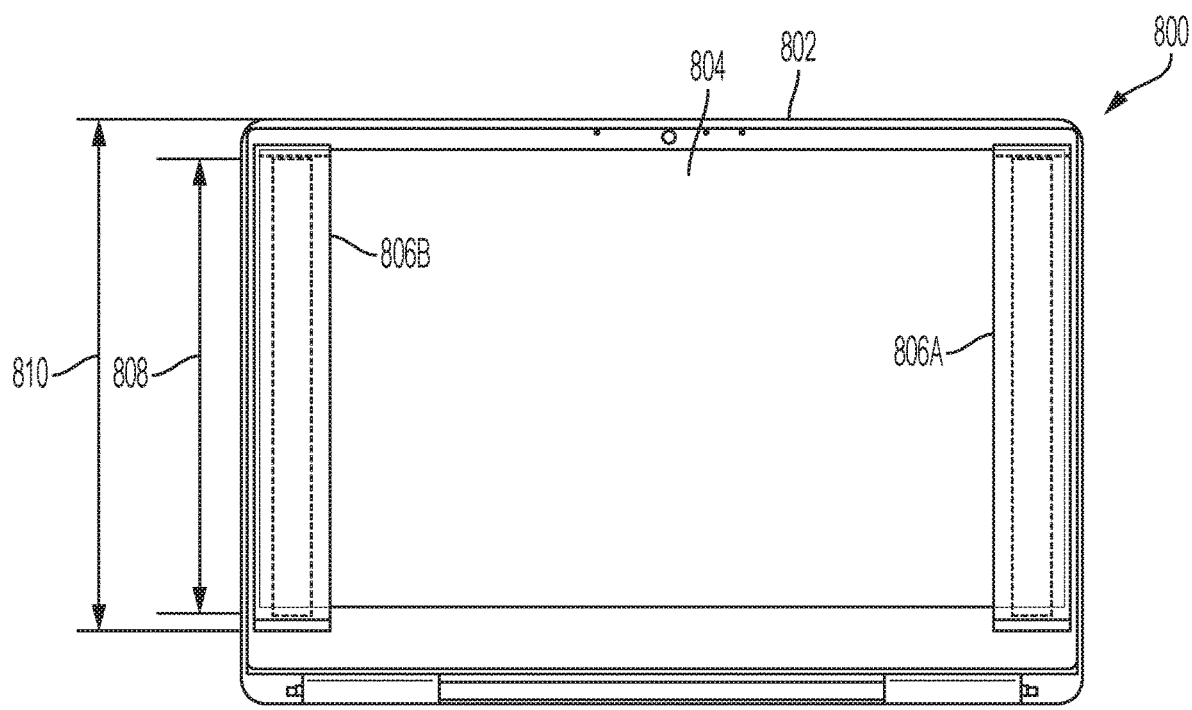
FIG. 8 is an illustration of an information handing system display with two pressure gauge strips aligned according to some embodiments of the disclosure.

As shown with respect to the display 800 of FIG. 8, a first pressure gauge strip 806A may be applied to a right hand side of a display panel 804 over a first strip of double-sided tape located between the display panel 804 and the display panel cover 802 and a second pressure gauge strip 806B may be applied to a left hand side of the display panel 804 over a second strip of double-sided tape located between the display panel 804 and the display panel cover 802. Thus, pressure gauge strips may be used to confirm that a predetermined pressure has been applied to multiple portions of a display panel. In some embodiments, the first and second pressure gauge strips 806A-B may be connected to each other via a sheet of protective Mylar® (PET) covering the surface of the display panel 804. The sheet of protective Mylar® (PET) may assist a technician in establishing and maintaining a proper alignment of the first and second pressure gauge strips 806A-B when laid out on the display panel 804, to allow a technician to verify that pressure has been applied to the appropriate locations on the display panel 804. In some embodiments, the first and second pressure gauge strips 806A-B may comprise pressure sensitive tape, in place of or in addition to Mylar® (PET) strips with tailor lines. The pressure sensitive tape may change color when the predetermined pressure is applied to the pressure sensitive tape. In some embodiments, a length 808 of double-sided tape between the display panel 804 and the display panel cover 802 may be less than a pressure gauge strip length 810. In some embodiments, an area of the double-sided tape may be less than an area of the pressure gauge strips 806A-B. Pressure gauge strips with a greater area than the double-sided tape may enable a technician to verify that pressure has been applied to an entire surface area of the display panel 804 adjacent to the double-sided tape.

Figure 9A:
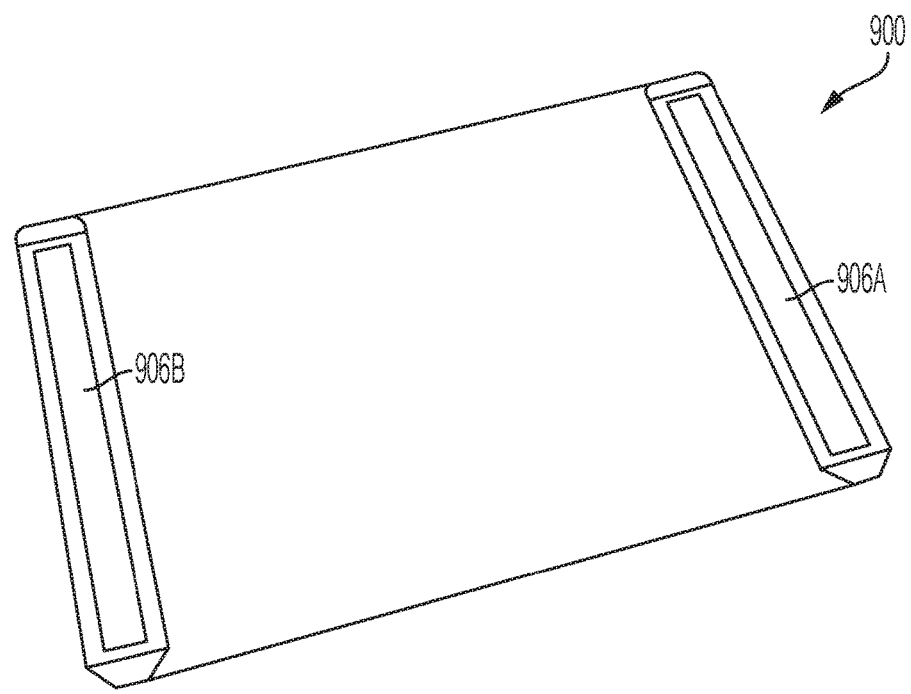
FIG. 9A is an illustration of a Mylar® (PET) sheet having two strips of pressure sensitive tape according to some embodiments of the disclosure.

An example sheet 900 of protective Mylar® (PET) is shown in FIG. 9A. The sheet 900 of protective Mylar® (PET) may include a first strip of pressure sensitive tape 906A on a right hand side and a second strip of pressure sensitive tape 906B on a left hand side. Alternatively or additionally, the sheet of protective Mylar® (PET) 900 may include other forms of pressure gauge strips, such as Mylar® (PET) strips having tailor lines and attached sponges, as disclosed herein, on the right and left hand sides. In some embodiments, tape, such as double-sided tape may be included at the ends of the pressure gauge strips 906A-B on the sheet 900 of protective Mylar® (PET), to secure the protective Mylar® (PET) 900 to a display panel while pressure is applied to the pressure gauge strips 906A-B and the display panel.

Figure 9B:
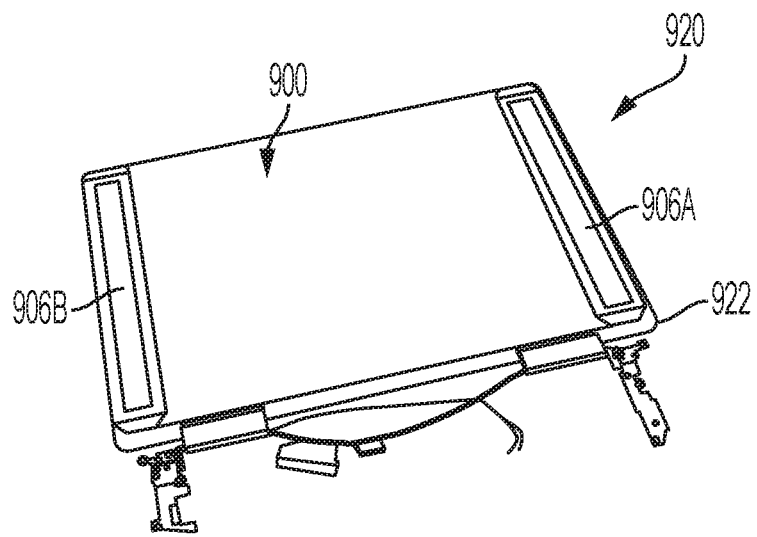
FIG. 9B is an illustration of a first stage of application of pressure to an information handling system display panel using a Mylar® (PET) sheet having two strips of pressure sensitive tape according to some embodiments of the disclosure.
Figure 9C:
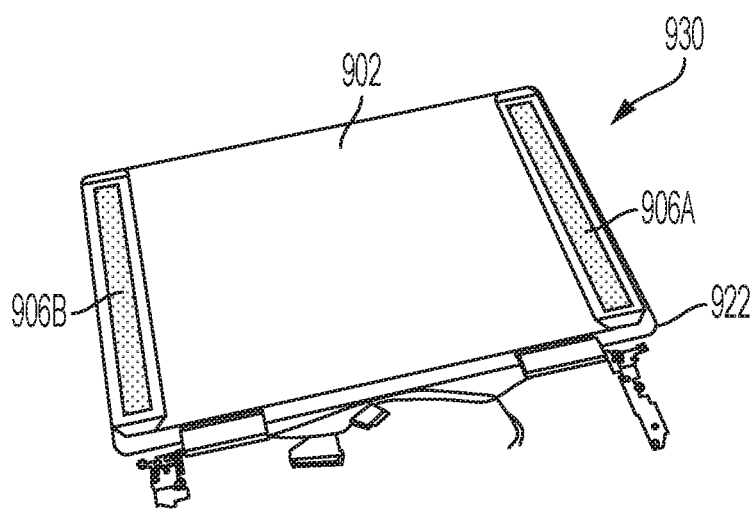
FIG. 9C is an illustration of a second stage of application of pressure to an information handling system display panel using a Mylar® (PET) sheet having two strips of pressure sensitive tape according to some embodiments of the disclosure.
Figure 9D:
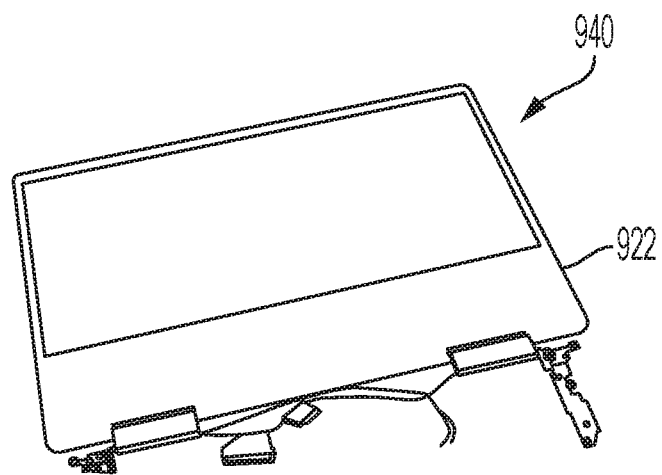
FIG. 9D is an illustration of a third stage of application of pressure to an information handling system display panel using a Mylar® (PET) sheet having two strips of pressure sensitive tape according to some embodiments of the disclosure.

The sheet of protective Mylar® (PET) 900 may be shaped to fit a display panel 922 of a display, as shown in diagram 920 of FIG. 9B. For example, a technician may align the sheet 900 of Mylar® (PET) on the display panel 922, as shown in FIG. 9B. When the sheet 900 of protective Mylar® (PET) is aligned on the display panel 922, the first and second strips of pressure sensitive tape 906A-B may be aligned over first and second strips of double-sided tape mounted between the display panel 922 and a display panel cover. When a technician applies a predetermined pressure to the strips of pressure sensitive tape 906A-B, such as a pressure sufficient to establish a stable attachment of the display panel 922 to the display panel cover via the strips of double-sided tape, the first and second strips of pressure sensitive tape 906A-B may change color, as shown in diagram 930 of FIG. 9C. The color change may be a change from transparent or white to red and may be an example of a pressure application indicator. After the pressure is applied, the sheet of protective Mylar® (PET) 900 may be removed, and the display panel 922 may be securely attached to the display panel cover, as shown in diagram 940 of FIG. 9D. Thus, a sheet of protective Mylar® (PET) may be used to assist in proper alignment of multiple pressure gauge strips over a display panel of a display.

Figure 10:
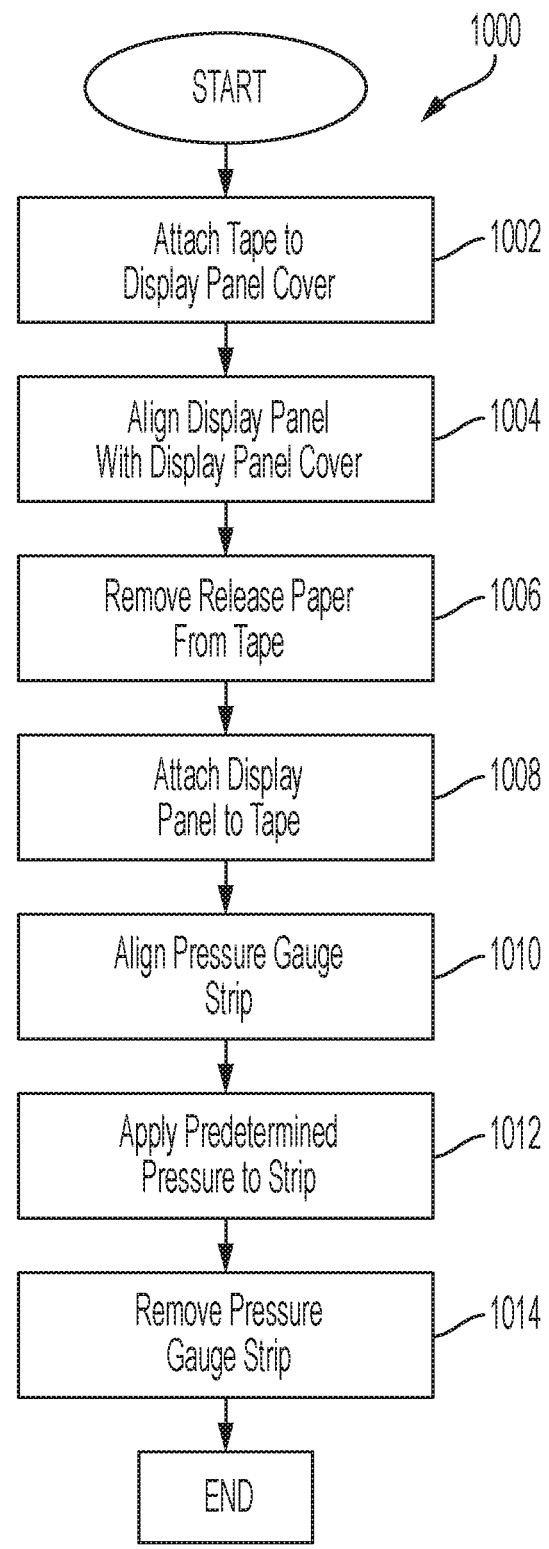
FIG. 10 is a flow chart of an example method for information handling system display assembly according to some embodiments of the disclosure.

A method 1000 for assembling an information handling system display is shown in FIG. 10. In some embodiments, the method 1000 may be performed by an individual, such as a trained technician. The method 1000 may begin, at step 1002, with attaching double-sided tape to a display panel cover of an information handling system display. For example, a first release paper may be removed from a first side of a piece of double-sided tape to expose adhesive on the first side of the double-sided tape. The first side of the double-sided tape may then be aligned with a desired portion of the display panel cover, such as an area on a right hand side of the display panel cover, and attached to the display panel cover. In some embodiments, a piece of double-sided tape may also be attached to a left hand side of the display panel cover. The double-sided tape may, for example, be [s]Safe-[r]Release™ tape (i.e., releasable tape).

At step 1004, a display panel may be aligned with a display panel cover. For example, the display panel may be placed on the display panel cover and one or more pieces of double-sided tape having release paper attached to a side of the double-sided tape adjacent the display panel. The alignment of the display panel and the display panel cover may be adjusted until a predetermined alignment is achieved.

When the predetermined alignment is achieved, release paper may be removed, at step 1006 from the surface of the double-sided tape adjacent the display panel. For example, a portion of the release paper, such as a tab, may extend out from between the display panel and the display panel cover. The release paper may be removed by pulling the portion of the release paper that extends out from between the display panel and the display panel cover. In some embodiments, the release paper may be reverse folded release paper. For example, a first portion of the release paper may extend along an entirety of a length of the second surface of the double-sided tape and may be attached to the second surface of the double-sided tape. A second portion of the release paper may extend back from an end of the first portion of the release paper, such as from a crease in the release paper. The second portion of the release paper may extend along an entirety of the first portion of the release paper. In some embodiments, the second portion of the release paper may extend beyond a starting point of the first portion of the release paper, such that the second portion of the release paper is longer than the first portion of the release paper and the double-sided tape. In some embodiments, pressure may be applied to the display panel to maintain a position of the display panel relative to the display panel cover while the release paper is removed. In some embodiments, release paper may be removed from a strip of double-sided tape attached to a right hand side of the display panel cover and from a strip of double-sided tape attached to a left hand side of the display panel cover.

At step 1008, the display panel may be attached to the second surface of the double-sided tape. For example, as the release paper is removed, the display panel may contact the second surface of the double-sided tape and adhesive on the second surface of the double-sided tape may adhere the tape to the display panel. The double-sided tape may thus attach the display panel to the display panel cover, fixing a position of the display panel relative to the display panel cover. In some embodiments, the display panel may be attached to the display panel cover by two or more strips of double-sided tape.

After the release paper is removed and the display panel is attached to the display panel cover, it may be advantageous to verify a connection between the display panel, the double-sided tape, and the display panel cover. At step 1010, a pressure gauge strip may be aligned with the display panel. For example, a pressure gauge strip may be aligned over at least a portion of a display panel surface opposite a surface of the display panel attached to the double-sided tape. In some embodiments, an area of the pressure gauge strip may be greater than an area of the double-sided tape, such that the pressure gauge strip covers an area of a display panel surface opposite a portion of the display panel attached to the double-sided tape and additional area of the display panel surface. In some embodiments, multiple pressure gauge strips may be aligned on portions of the display panel surface opposite multiple portions of the display panel attached to multiple pieces of double-sided tape. For example, in some embodiments a sheet of protective Mylar® (PET) may be shaped to enable proper alignment of multiple pressure gauge strips simultaneously. The sheet of protective Mylar® (PET) may have pressure gauge strips coupled to a right hand side and a left hand side of the sheet of protective Mylar® (PET) and may be centered on the display panel surface, aligning a first pressure gauge strip with a first piece of double-sided tape under the display panel and a second pressure gauge strip with a second piece of double-sided tape under the display panel.

At step 1012, a predetermined pressure may be applied to the pressure gauge strip. The predetermined pressure may be selected based on a pressure required to securely attach the display panel to the display panel cover using the double-sided tape. For example, the double-sided tape may require a predetermined pressure to adhere to objects. The predetermined pressure may, for example, be a pressure sufficient to cause a pressure application indicator to appear on the pressure gauge strips. For example, the pressure gauge strip may be a Mylar® (PET) strip with a sponge mounted beneath the Mylar® (PET) strip and a tailor line in the Mylar® (PET) strip. When the predetermined pressure is applied to an area of the pressure gauge strip within the tailor line, the pressure gauge strip may break along the tailor line and the sponge may be compressed. The Mylar® (PET) strip may make a snapping sound as it breaks along the tailor line, alerting a technician that sufficient pressure has been applied. In some embodiments, the pressure gauge strip may include pressure sensitive tape in addition to or in place of the Mylar® (PET) strip with the tailor line. The pressure sensitive tape may change color, such as changing from white or transparent to red, when the predetermined pressure is applied. After the predetermined pressure is applied to the pressure gauge strip, the pressure gauge strip may be removed at step 1014. In some embodiments, a sheet of protective Mylar® (PET) including multiple pressure gauge strips may be removed from the information handling system display panel. Thus, double-sided tape including at least one release paper having a reverse fold and pressure gauge strips may be used to enhance assembly of information handling system displays.

The flow chart diagram of FIG. 10 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for assembling an information handling system display, comprising:
    attaching a first side of a strip of double-sided tape having a second side attached to a release paper to a display panel cover;
    aligning a display panel with the display panel cover, wherein the aligned display panel is in contact with the release paper attached to the second side of the double-sided tape;
    removing the release paper from the double-sided tape, while the display panel is in contact with the release paper;
    attaching a first surface of the display panel to the second side of the double-sided tape as the release paper is removed;
    aligning a pressure gauge strip with a first portion of a second surface of the display panel opposite a first portion of the first surface that is attached to the second side of the double-sided tape, wherein the pressure gauge strip comprises a biaxially oriented polyethylene terephthalate (PET) strip comprising a tailor line;
    applying at least a predetermined pressure to the pressure gauge strip; and
    removing the pressure gauge strip from the display panel.

2. The method of claim 1, wherein the double-sided tape comprises releasable tape.

3. The method of claim 1, wherein the release paper comprises reverse folded release paper, wherein a first portion of the release paper extends beyond the display panel when the display panel is aligned with the display panel cover, and wherein removing the release paper comprises pulling the release paper out from between the display panel and the double-sided tape using the first portion of the release paper.

4. The method of claim 1, wherein a PET sheet comprises the pressure gauge strip, aligning the pressure gauge strip comprises aligning the PET sheet with the display panel, and removing the pressure gauge strip comprises removing the PET sheet from the display panel.

5. The method of claim 1, wherein applying the predetermined pressure comprises applying at least a pressure sufficient to attach the display panel to the display panel cover via the double-sided tape.

6. The method of claim 4, wherein aligning the PET sheet with the display panel comprises aligning a center of the PET sheet with a center of the display panel and placing the PET sheet on the display panel.

7. The method of claim 1, wherein the pressure gauge strip further comprises a sponge attached to the PET strip, and wherein applying at least the predetermined pressure to the pressure gauge strip comprises applying a pressure to a first portion of the PET strip inside the tailor line sufficient to compress the sponge and cause the PET strip to break along the tailor line.

8. The method of claim 7, wherein an area inside the tailor line of the PET strip is greater than an area of the double-sided tape.

9. The method of claim 7, wherein the tailor line makes a snapping sound when the predetermined pressure is applied to the first portion of the PET strip.

10. A method for information handling system display assembly, the method comprising:
    aligning a pressure gauge strip with a first portion of a first surface of a display panel opposite a first portion of a second surface of the display panel that is attached to a display panel cover with double-sided tape, wherein the pressure gauge strip comprises a biaxially oriented polyethylene terephthalate (PET) strip and a sponge attached to the PET strip;
    applying at least a predetermined pressure to the pressure gauge strip, wherein the application of the predetermined pressure causes a pressure application indicator to appear on the pressure gauge strip; and
    removing the pressure gauge strip from the display panel.

11. The method of claim 10, wherein applying the predetermined pressure comprises applying at least a pressure sufficient to attach the display panel to the display panel cover via double-sided tape.

12. The method of claim 10, wherein the pressure gauge strip comprises pressure-sensitive tape, wherein applying at least the predetermined pressure to the pressure gauge strip comprises applying at least the predetermined pressure to the pressure-sensitive tape, and wherein the pressure application indicator comprises a color change in the pressure-sensitive tape.

13. The method of claim 10,
wherein the PET strip comprises a tailor line,
wherein applying at least the predetermined pressure to the pressure gauge strip comprises applying a pressure to a first portion of the PET strip inside the tailor line sufficient to compress the sponge and cause the PET strip to break along the tailor line; and
wherein the pressure application indicator comprises a break along the tailor line.

14. The method of claim 13, wherein the tailor line makes a snapping sound when the predetermined pressure is applied to the first portion of the PET strip.

15. The method of claim 10, wherein aligning the pressure gauge strip comprises aligning a sheet with the display panel, wherein the sheet comprises the pressure gauge strip and is configured to align the pressure gauge strip with the first portion, and wherein removing the pressure gauge strip comprises removing the sheet from the display panel.

\* \* \* \* \*